March 25, 1941.　　J. W. LEIGHTON　　2,236,410
REAR END SUSPENSION
Filed May 24, 1940
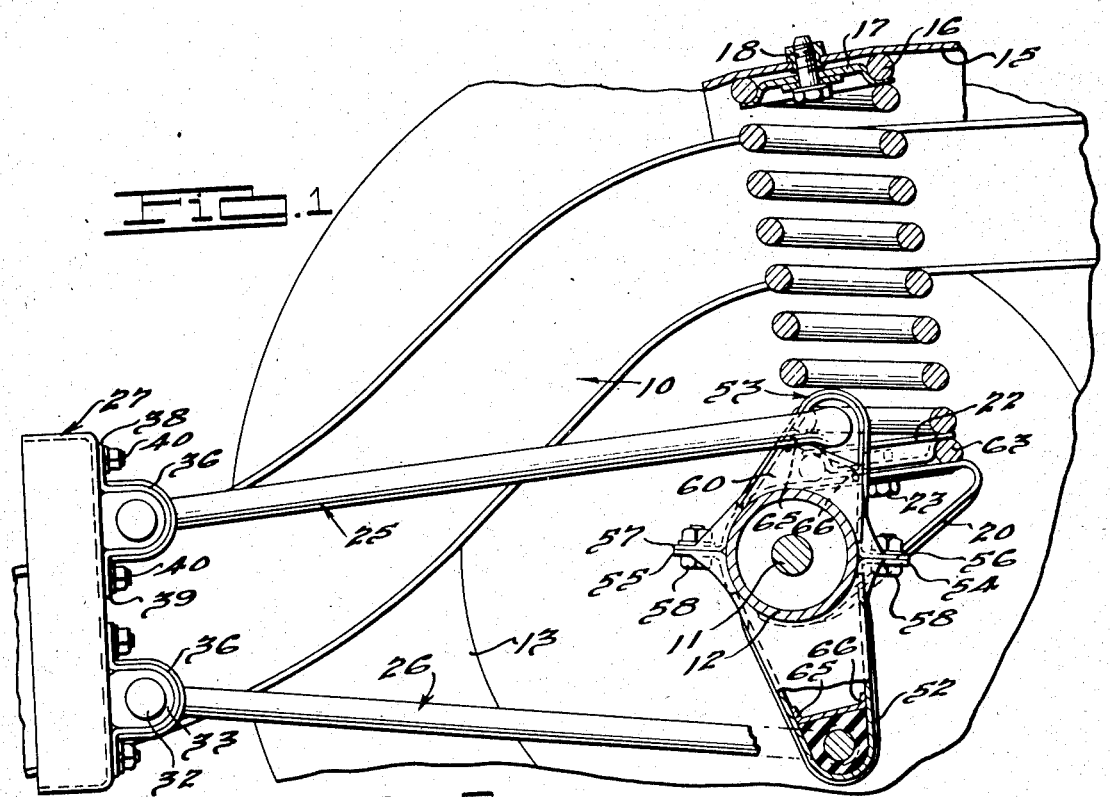
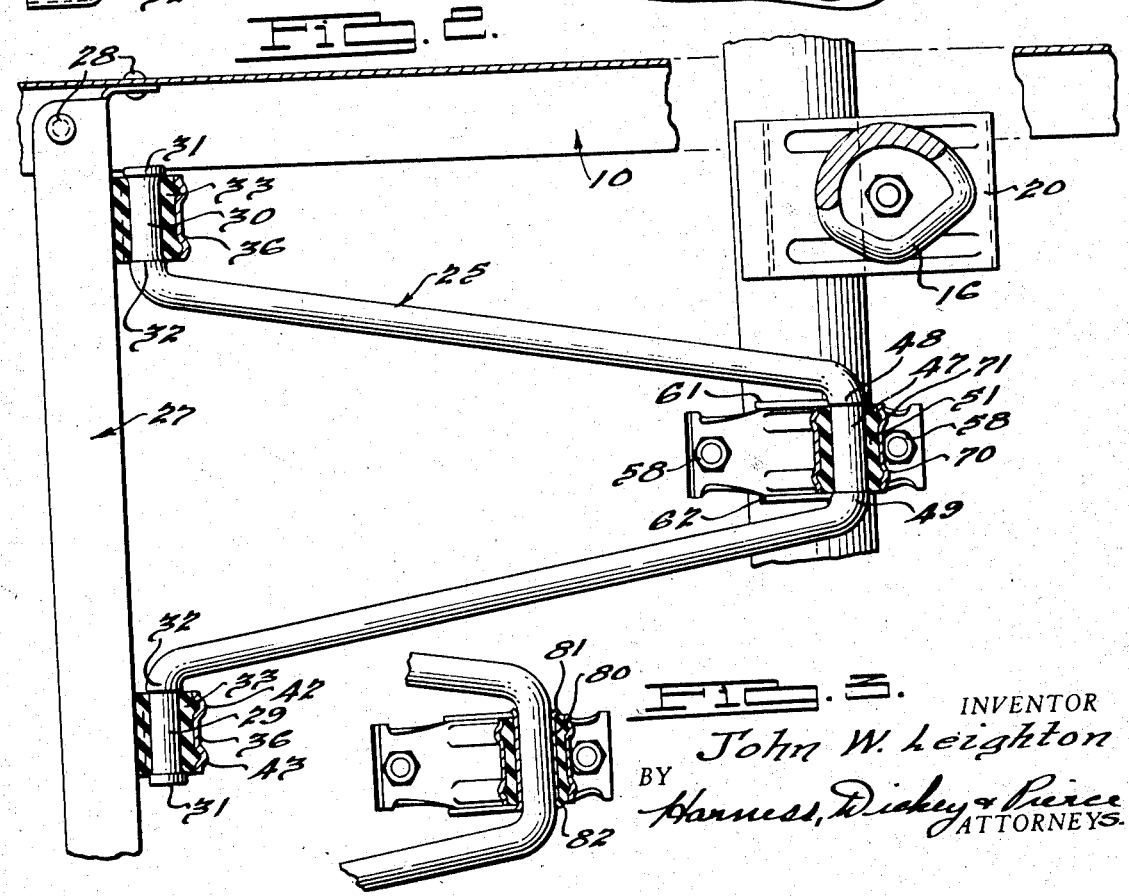
INVENTOR
John W. Leighton
BY Harness, Dickey & Pierce
ATTORNEYS.

Patented Mar. 25, 1941

2,236,410

UNITED STATES PATENT OFFICE 2,236,410

REAR END SUSPENSION

John W. Leighton, Port Huron, Mich.

Application May 24, 1940, Serial No. 337,001

18 Claims. (Cl. 267—67)

The invention relates generally to motor vehicles and it has particular relation to a suspension connecting the chassis frame to the rear axle housing.

At the present time, in connection with certain motor vehicles, it is standard practice to mount the chassis frame on the rear axle housing by means of vertically arranged coil springs, and where this practice is employed, it is necessary to provide some means for preventing side sway of the frame relative to the axle. Moreover, if the transmission employed is of the Hotchkiss drive type, some means must be used for counteracting the tendency for the axle housing to turn with the axle, especially when the brakes are applied. Additionally, some means must be provided for preventing relative movement of the frame and housing in a direction longitudinally of the vehicle, which is apt to occur especially during acceleration or deceleration of the vehicle.

One object of the present invention is to provide a simple and inexpensive means for accomplishing the desired results stated heretofore.

Another object of the invention is to provide means linking the axle housing to the chassis frame, which may be easily connected to the parts and which is also characterized by the facility with which replacements may be made.

Another object of the invention is to provide means such as stated in the last mentioned object, which embodies rubber cushioning elements for absorbing vibration and for enhancing the comfort or riding qualities of the vehicle.

Another object of the invention is to provide connecting means as before stated, which embody a minimum number of parts constructed by very simple manufacturing operations, to the end that the cost of manufacturing will be reduced to a minimum.

Other objects of the invention will become apparent from the following specification, from the drawing to which the specification relates, and from the claims hereinafter set forth.

For a better understanding of the invention, reference may be had to the drawing, wherein:

Figure 1 is a fragmentary, cross-sectional view of a chassis frame and axle, showing inter-connecting means between the axle housing and the frame as constructed according to one form of the invention;

Fig. 2 is a plan view, partly in section, of the arrangement shown by Fig. 1;

Fig. 3 is a cross-sectional view of a pivotal connection between the axle housing and one of the U-shaped bars illustrated, which embodies another form of the invention.

Referring to the figures, a chassis frame is indicated at 10, a rear axle at 11, and the rear axle housing at 12. One of the rear wheels is indicated at 13 and it will be understood that a wheel is mounted on each end of the axle and that the axle is drivingly connected to a transmission shaft extending forwardly from the central part of the axle. A cross frame element 15 rests on oppositely disposed coil springs 16, only one of which is shown, and the upper convolution of the spring is positively connected to the frame by means of a suitable retaining element 17 connected to the frame member by bolt fastening means 18. The lower convolution of the spring rests on a bracket 20 partially embracing the axle housing and which is welded thereto, and the spring is fastened to this bracket by a retainer member 22 and bolt fastening means 23, as described in connection with the upper end of the spring.

Now according to the present invention, a pair of U-shaped bars 25 and 26 interconnect the axle housing 12 and a second cross frame member 27 located forwardly of the axle housing and it is to be understood that a pair of such bars are provided at each side of the frame. This second cross frame member 27 is suitably connected to the longitudinally extending side members of the chassis frame in any suitable manner such as by rivets 28 and the central part of the frame member may be suitably deflected or arranged to accommodate the forwardly extending transmission shaft.

The base portions of the U-shape bars 25 and 26 are disposed, respectively, at the upper and lower sides of the axle housing 12 and the legs converge slightly towards the frame member 27. The ends of the legs of each bar, as seen in Fig. 3, terminate in journal or trunnion portions 29 and 30 and each portion has an upset collar 31 at one end and an upset enlargement 32 at its other end. Between the collar 31 and enlargement 32, rubber sleeves 33 embrace the trunnion or journal portions, respectively, and these sleeves are positively held on the frame member 27 by U-shaped strap elements 36 which terminate in legs 38 and 39 fastened to the frame member by bolt fastening means 40.

The strap elements 36 have pressed-out beads or ribs 42 and 43 and these not only strengthen and reinforce the straps but also provide recesses into which the rubber may flow. The size of the sleeves 33 initially is such that when the straps are fastened to the frame, the rubber is compressed sufficiently to force the rubber into the grooves formed by the ribs 42 and 43, and thus when the straps are finally in the positions shown, the rubber sleeves are positively anchored in the straps and are positively anchored on the trunnion portions of the bar between the upset enlargements 32 and collars 31. With this condition and relation of parts, the sleeves normally cannot slip out of the straps and the trunnion or journal portions of the bar cannot free themselves from the sleeves. Moreover, it will be observed that the bends in the ends of the bar are so located with respect to the straps that movement of the bar laterally of the frame in either direction is definitely so limited that the trunnion or journal portion on either end positively cannot move but a fraction of the length of the rubber sleeve. This insures a positive connection regardless of forces tending to move the frame or axle housing relative to the bars. It will be further observed at this time that the rubber sleeves permit a universal movement of the frame with respect to the bar within limits and that this universal movement is at all times cushioned.

The base portion of each bar has a journal 47 provided with upset enlargements 48 and 49 at its ends and this journal portion has a rubber sleeve 51 thereon. The mounting for the rubber sleeve comprises lower and upper U-shaped straps 52 and 53 that open towards each other and which jointly straddle the axle housing 12. The legs of the strap 52 terminate in flanges 54 and 55 and correspondingly the legs of strap 53 terminate in flanges 56 and 57 and the flanges at each side of the housing are connected by bolt fastening means 58. At the upper side of the axle housing, another U-shaped strap 60 is provided which, as best shown by Fig. 3, has legs 61 and 62 extending down to the housing and which have their lower edges fitting such housing and welded thereto. This strap member 60 at its upper end has a base portion 63 extending parallel to the trunnion 47 and through the strap 53 and such base portion forms the lower support for the rubber sleeve 51. It may be observed that the width of the leg portions 61 and 62 of the strap 60 is such as to overlap the edges of the legs of strap 53 and, in order to allow for this and at the same time have the base portion 63 of strap 60 disposed between the legs of the strap 53, slits are formed at opposite ends of the base 63 and the metal is bent downwardly as shown at 65 and 66.

From the description so far given, it is to be understood that the legs of strap 60 cover the open space at the end of strap 53 from the periphery of the axle housing to the rubber sleeve 51 and that outwardly of the base 63 of the strap 60, the rubber sleeve is disposed in the upper end portion of the strap 53. The base portion of bar 26 is associated with the strap 52 in the same way, although in this case the strap corresponding to strap 60 and indicated at 65 is larger than the latter in order to conform to strap 52. Attention is directed to the fact that each of the straps 52 and 53 has beads or pressed-out ribs 70 and 71 into which the rubber flows when the straps are fastened together. Lateral movement of the bar with respect to the mounting described is definitely limited by the bends at the ends of the trunnion portion 47.

In general, in may be observed now that each trunnion or journal portion of each bar is resiliently mounted in a rubber sleeve, that a definite amount of movement is permitted before metal-to-metal engagement can occur, that the relative movement at each connection may be of limited, universal character, and that the shape of the bar is such as to give it strength and rigidity in preventing undesired movement of the frame relative to the axle housing. It will be further noted that each point of connection may be easily assembled and dis-assembled and therefore that replacement of rubber sleeves, if ever necessary, can be accomplished very easily, and that when the parts are assembled, the bars cannot actually become disconnected because of the bends and relation of parts. The bars, being U-shaped, will have lateral stability and therefore will have considerable resistance to lateral bending as a unit and furthermore, they will have longitudinal stability to take shocks imparted in a longitudinal direction. Furthermore, the upper and lower bars jointly will strongly resist any tendency of the axle housing to turn with respect to the frame, such as occasioned by torque forces.

It may be stated in connection with each of the bars 25 and 26, that the trunnion portions 29 and 30 and 47 are of the same diameter as the body portion of the bar and that the shoulders or enlargements at the ends of the trunnion portions are formed by axial upsetting operations. This is effected by holding the trunnion portion against expansions in a die opening and then, by axial forces, upsetting the metal so as to form the enlargements 31, 32 and 48 and 49. Thus each bar is formed from a bar of round stock which is bent to the shape shown and then, by holding the trunnion portions against expansion, the shoulders at each end thereof may be formed by axially directed upsetting operations. The upsetting operation on each trunnion portion is effected preferably after the latter is heated.

Now directing attention to Fig. 3, a modification is shown which essentially comprises a sleeve 80 around each trunnion portion of the bar in place of the upset shoulders. In this case the sleeve has outwardly turned edges 81 and 82 which form shoulders for engaging the ends of the rubber sleeve. The sleeve 80 may be copper welded to the trunnion portion of the bar and may be formed in two semi-cylindrical parts that are brought together. Copper welding of the sleeve to the bar will be well understood by those skilled in the art as comprising the welding by melting copper wire or the like so disposed that the metal will flow into the cracks and openings between the sleeve and bar and effecting this in an inert atmosphere.

The ends of the bars may be provided with metal sleeves in the same manner. By employing this modification, upsetting of the bars is unnecessary at any point and the bars may have one diameter throughout.

With a pair of upper and lower U-bars at each side of the frame, it will be appreciated that stability will be provided in the manner previously indicated, while still obtaining desired flexibility and cushioned movement, although limited, in different directions.

Although more than one form of the invention has been described and illustrated, it will be apparent to those skilled in the art that various modifications may be made without departing from the scope of the appended claims.

What is claimed is:

1. The combination with a vehicle chassis frame, a cross frame member thereon, and an axle housing member extending transversely of the frame in spaced relation to the cross frame member, of a one piece U-shape bar having diverging legs terminating in offset, outwardly directed ends which are substantially parallel to the base of the bar, means providing a rubber bearing on one of said members for each of said ends on the bar, and means providing a rubber bearing on the other member for the base of the bar, each of said ends and base portion of the bar having longitudinally spaced upset shoulders providing a shallow annular groove or recess between them for locating the rubber bearing.

2. The combination with a vehicle chassis frame, a cross frame member thereon, and an axle housing member extending transversely of the frame in spaced relation to the cross frame member, of upper and lower, one piece U-shape bars each having diverging legs terminating in offset ends which are parallel to the base of the bar, means providing an upper and lower rubber bearing on one of said members for said ends of the bars respectively, and means providing upper and lower rubber bearings for the base portions of the bars on the other member, said last mentioned means including a pair of U-shape straps releasably connected together.

3. The combination with a vehicle chassis frame, a cross frame member thereon, and an axle housing member extending transversely of the frame in spaced relation to the cross frame member, of upper and lower U-shape bars having diverging legs terminating in offset ends substantially parallel to the base of the bar, bearing means on the cross member for said ends, upper and lower rubber bearings on the housing and receiving the upper and lower base portions of the bars respectively, a downwardly open U-shape strap embracing the upper rubber bearing, an upwardly open U-shape strap embracing the lower rubber bearing, and means connecting the legs of one strip to the legs of the other.

4. The combination with a vehicle chassis frame, a cross frame member thereon, and an axle housing member, extending transversely of the frame in spaced relation to the cross frame member, of upper and lower U-shape bars having diverging legs terminating in offset ends substantially parallel to the base of the bar, bearing means on the cross member for said ends, a bracket fastened to the upper side of the housing and providing a support for a rubber bearing on the base portion of the upper bar, a similar bracket on the lower side of the housing and providing a support for a rubber bearing on the base portion of the lower bar, a downwardly open U-shape strap embracing the upper rubber bearing for holding it on its bracket, an upwardly open U-shape strap embracing the lower rubber bearing for holding it on its bracket, and means releasably connecting the legs of one strap to the legs of the other strap.

5. The combination with a vehicle chassis frame, a cross frame member thereon, and an axle housing member extending transversely of the frame in spaced relation to the cross frame member, of upper and lower U-shape bars having diverging legs terminating in offset ends substantially parallel to the base of the bar, bearing means on the cross member for said ends, a bracket fastened to the upper side of the housing and providing a support for a rubber bearing on the base portion of the upper bar, a similar bracket on the lower side of the housing and providing a support for a rubber bearing on the base portion of the lower bar, a downwardly open U-shape strap embracing the upper rubber bearing for holding it on its bracket, an upwardly open U-shape strap embracing the lower rubber bearing for holding it on its bracket, and means releasably connecting the legs of one strap to the legs of the other strap, said straps being so disposed that they straddle the axle housing.

6. The combination with a vehicle chassis frame, a cross frame member thereon, and an axle housing member extending transversely of the frame in spaced relation to the cross frame member, of upper and lower U-shape bars having diverging legs terminating in offset ends substantially parallel to the base of the bar, bearing means on the cross member for said ends, a downwardly opening U-shape bracket on the upper side of the housing and having its legs welded to the latter, a downwardly opening U-shape trap disposed over the bracket so that jointly a pocket is provided between the base portions of the bracket and strap, a rubber bearing in said pocket and receiving the base portion of the upper bar, an upwardly open U-shape bracket at the lower side of the axle housing and welded thereto, an upwardly open U-shape strap disposed over the bracket and forming therewith a pocket between the base portions, a rubber bearing in the latter pocket receiving the base portion of the lower bar, and means fastening the legs of one strap to the legs of the other.

7. The combination with a vehicle chassis frame, a cross frame member thereon, and an axle housing member extending transversely of the frame in spaced relation to the cross frame member, of U-shape bars each of one piece character and extending between the axle housing and cross member with one bar disposed above the other, the base of each bar providing a bearing portion and the ends of the legs of the bars terminating in bent journals or trunnions disposed substantially parallel to the base portions thereof, rubber bearing sleeves mounted on the cross member and axle member and receiving the journals and bearing portions of the bars, and integral shoulders at the opposite ends of each bearing portion and journal and abutting the ends of the rubber sleeves for holding the sleeves in proper positions on the bars.

8. The combination with a vehicle frame and an axle housing, a link for connecting the frame and housing, means pivotally connecting the link to the frame, and means pivotally connecting the link to the axle housing, said last named means comprising a pair of U-shape strap elements, one within the other and open in the same direction with their base portions separated and the leg portions of one strap disposed in a plane crosswise of the plane in which the legs of the other are located, a bearing between the base portions and a journal on the link received by said bearing.

9. The combination with a vehicle frame and an axle housing, a link for connecting the frame and housing, means pivotally connecting the frame and housing, means pivotally connecting the link to the frame, and means pivotally connecting the link to the axle housing, said last named means comprising a pair of U-shape strap elements, one within the other and open in the same direction with their base portions separated and the leg portions of one strap disposed in a plane crosswise of the plane in which the legs of the other are located, a rubber sleeve between the two base portions of the straps, and a journal on the link and which extends through the sleeve.

10. The combination with a vehicle frame and an axle housing, a link for connecting the frame and housing, means pivotally connecting the link to the frame, and means pivotally connecting the link to the axle housing, said last named means comprising a pair of U-shape strap elements, one within the other and open in the same direction with their base portions separated and the leg portions of one strap disposed in a plane crosswise of the plane in which the legs of the other are located, a rubber sleeve between the two base portions of the straps, a journal on the link and which extends through the sleeve, and means on the legs of one of the straps interengaging the legs of the other strap for preventing movement of either strap in its own plane relative to the other strap.

11. The combination with a vehicle frame and an axle housing, a link for connecting the frame and housing, means pivotally connecting the link to the frame, a pair of U-shape strap elements one within the other and open in the same direction with their base portions separated and the leg portions of one strap disposed in a plane crosswise of the plane in which the legs of the other are located, a trunnion on the link and extending into the space between the strap bases, and a rubber sleeve in said space and around said trunnion, the legs of the inner strap extending into overlapping relation to the edges of outer strap.

12. In a pivotal mounting, a pair of U-shape straps one within the other and open in the same direction with their base portions separated, the leg portions of the inner strap being disposed in a plane crosswise of the plane in which the legs of the outer strap are located and having their lateral edges extending over the lateral edges of the legs on the other strap, a rubber sleeve bearing in the space between the two base portions, and a journal element in said sleeve.

13. In a pivotal mounting, a pair of U-shape straps one within the other and open in the same direction with their base portions separated, the leg portions of the inner strap being disposed in a plane crosswise of the plane in which the legs of the outer strap are located and having their lateral edges extending over the lateral edges of the legs on the other strap, a rubber sleeve bearing in the space between the two base portions, a journal element in said sleeve, and means retaining the sleeve in said space and comprising depressed portions in the wall of the outer strap into which the rubber projects.

14. In combination with an axle housing, a pair of U-shape straps disposed at opposite sides of the housing and having their legs directed towards each other so that the straps jointly straddle the housing, means between the housing and inner side of each strap and forming a bearing for a pivotal element, and means connecting the legs of one strap to the legs of the other.

15. In combination with an axle housing, a pair of U-shape straps disposed at opposite sides of the housing and having their legs directed towards each other so that the straps jointly straddle the housing, supports fastened on the axle housing and disposed respectively within each strap, a rubber bearing element within each strap and between the support therein and the base of the strap, and means connecting the legs of one strap to the legs of the other.

16. In a pivotal mounting, a U-shape bar having a trunnion portion at its base and offset, bent end trunnion portions, the bar at each end of each trunnion portion being upset axially of the trunnion to form a shoulder or abutment, the trunnion portions having a retained diameter corresponding to the remainder of the bar excepting for the shoulders.

17. In a pivotal mounting, a U-shape bar having a base portion and legs terminating in offset or bent portions parallel to the base, said bar being axially upset at opposite ends of each base and bent portion to provide shoulders, the bar other than for the shoulders being uniform in diameter.

18. In a pivotal mounting, a bar having parallel bent portions, and a sleeve copper welded on each portion and having outwardly directed end flanges forming shoulders.

JOHN W. LEIGHTON.